(12) United States Patent
Mushiga et al.

(10) Patent No.: US 11,920,680 B2
(45) Date of Patent: Mar. 5, 2024

(54) CONTROLLER FOR VEHICLE

(71) Applicant: TOYOTA JIDOSHA KABUSHIKI KAISHA, Toyota (JP)

(72) Inventors: Kentaro Mushiga, Okazaki (JP); Junji Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 350 days.

(21) Appl. No.: 17/475,769

(22) Filed: Sep. 15, 2021

(65) Prior Publication Data
US 2022/0128130 A1 Apr. 28, 2022

(30) Foreign Application Priority Data
Oct. 28, 2020 (JP) .................... 2020-180540

(51) Int. Cl.
*F01M 1/02* (2006.01)
*B60K 6/24* (2007.10)
(Continued)

(52) U.S. Cl.
CPC ............. *F16H 7/0829* (2013.01); *B60K 6/24* (2013.01); *B60K 6/26* (2013.01); *B60K 6/442* (2013.01); *B60W 20/20* (2013.01); *B60W 2510/0638* (2013.01); *B60Y 2200/92* (2013.01); *B60Y 2300/182* (2013.01); *B60Y 2400/785* (2013.01);
(Continued)

(58) Field of Classification Search
CPC ........... F16H 7/0829; F16H 2007/0812; F16H 2007/0872; F16H 2007/0885; F16H 3/724; F16H 7/08; F16H 7/0834; F16H 2007/0893; F16H 2007/0897; F16H 55/30; B60W 20/20; B60W 2510/0638; B60W 2710/30; B60W 10/06; B60W 10/08; B60W 10/30; B60W 30/192; B60W 20/15; B60W 20/00; B60K 6/24; B60K 6/26; B60K 6/442; B60K 2006/381; B60K 6/445; B60K 1/02; B60K 6/365; F01L 1/022; F01M 2001/0269; B60Y 2200/92; B60Y 2300/182; B60Y 2400/785
See application file for complete search history.

(56) References Cited

U.S. PATENT DOCUMENTS

| | | | |
|---|---|---|---|
| 8,951,154 B2 * | 2/2015 | Konuma | F16H 7/0848 474/110 |
| 2006/0289236 A1 | 12/2006 | Nishino | |
| 2020/0271053 A1 * | 8/2020 | Koishi | F02N 11/0855 |

FOREIGN PATENT DOCUMENTS

| | | |
|---|---|---|
| JP | 2007-002767 A | 1/2007 |
| JP | 2009-102992 A | 5/2009 |

(Continued)

*Primary Examiner* — Tisha D Lewis
(74) *Attorney, Agent, or Firm* — Finnegan, Henderson, Farabow, Garrett & Dunner, LLP

(57) ABSTRACT

A vehicle includes a chain tensioner that serves as an oil damper using oil supplied from an oil pump. The vehicle includes a controller that controls a traveling mode of the vehicle in a BEV mode or a non-BEV mode. When shifting the traveling mode from the BEV mode to the non-BEV mode, the controller executes a high-pressure process for controlling the oil pump such that a supply pressure of oil supplied to the chain tensioner becomes higher when a duration of the BEV mode is greater than or equal to a specified time than when the BEV mode duration is less than the specified time.

4 Claims, 5 Drawing Sheets

(51) Int. Cl.
  *B60K 6/26* (2007.10)
  *B60K 6/442* (2007.10)
  *B60W 10/06* (2006.01)
  *B60W 20/20* (2016.01)
  *F16H 7/08* (2006.01)

(52) U.S. Cl.
  CPC ............... *F01M 2001/0269* (2013.01); *F16H 2007/0812* (2013.01); *F16H 2007/0872* (2013.01); *F16H 2007/0885* (2013.01)

(56) References Cited

FOREIGN PATENT DOCUMENTS

JP    2014-109237 A    6/2014
JP    2015-063922 A    4/2015
JP    2016-109233 A    6/2016

* cited by examiner

CONTROLLER FOR VEHICLE

BACKGROUND

1. Field

The following description relates to a controller for a vehicle.

2. Description of Related Art

Japanese Laid-Open Patent Publication No. 2014-109237 discloses a vehicle that includes a drive sprocket, two idler sprockets, a chain, a swing guide, and a chain tensioner. The drive sprocket is attached to the crankshaft of an internal combustion engine. The idler sprockets are attached to the intake camshaft and the exhaust camshaft of the internal combustion engine. The chain runs around the drive sprocket and the two idler sprockets. The swing guide is located near the chain. The internal combustion engine supports the swing guide in a manner allowing the swing guide to swing. The chain tensioner pushes the swing guide against the chain. That is, the chain tensioner uses the swing guide to apply tension to the chain. The chain tensioner is supplied with oil. The chain tensioner has the functionality of an oil damper.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a vehicle is provided. The vehicle includes an internal combustion engine, a motor generator, a drive sprocket fixed to a crankshaft of the internal combustion engine, an idler sprocket to which a driving force is transmitted from the drive sprocket, a chain running around the drive sprocket and the idler sprocket, a swing guide supported in a swingable manner, a chain tensioner that pushes the swing guide against the chain, and an oil pump that discharges oil when the crankshaft rotates. The controller is configured to control a traveling mode of the vehicle in a Battery Electric Vehicle (BEV) mode that stops the internal combustion engine and drives the motor generator when the vehicle travels or a non-BEV mode that drives the internal combustion engine when the vehicle travels. The chain tensioner has an oil damper functionality that uses oil supplied from the oil pump. When shifting the traveling mode from the BEV mode to the non-BEV mode, the controller is configured to execute a high-pressure process for controlling the oil pump such that a supply pressure of oil supplied to the chain tensioner becomes higher when a duration of the BEV mode is greater than or equal to a specified time than when the BEV mode duration is less than the specified time.

A known vehicle includes a motor generator as a driving source in addition to an internal combustion engine. Such a vehicle can travel in a Battery Electric Vehicle (BEV) mode in which the motor generator is driven while the internal combustion engine is stopped.

When a vehicle capable of travelling in the BEV mode includes the chain tensioner as described in the background, the internal combustion engine is stopped in the BEV mode. This stops the oil pump operated by the combustion engine, which serves as a driving source, from supplying oil to the chain tensioner. In this state, when the chain applies force that acts on the chain tensioner to operate, air in an oil passage from the oil pump to the chain tensioner may enter the chain tensioner. When the air enters the chain tensioner, it will take time to discharge the air from the chain tensioner and the chain tensioner may be adversely affected when serving as an oil damper.

In contrast, according to the above aspect, when the BEV mode duration is greater than or equal to the specified time, specifically, when there are more opportunities for air to enter the chain tensioner, a supply pressure of oil becomes higher. This increases the amount of oil flowing into the chain tensioner and the amount of oil discharged from chain tensioner than when the BEV mode duration is less than the specified time. The air in the chain tensioner is more likely to be discharged to the outside together with the oil. Thus, even if the chain tensioner includes air when the traveling mode of the vehicle shifts from the BEV mode to the non-BEV mode, the air is promptly discharged.

In the above structure, the controller may execute the high-pressure process on condition that an engine speed of the internal combustion engine is less than or equal to a specified rotation speed. With the structure, the high-pressure process is not executed when the engine speed of the internal combustion engine is more than the specified rotation speed and the pressure of the oil supplied from the oil pump to the chain tensioner is sufficient. Thus, there is no energy loss when, for example, the high-pressure process is executed.

In the above structure, the controller may increase the supply pressure in the high-pressure process as the BEV mode duration becomes longer. This increases the supply pressure in the high-pressure process as the BEV mode duration becomes longer and the likelihood of air being included in the chain tensioner increases. Thus, even when the BEV mode duration becomes longer, air is promptly discharged from the chain tensioner in the following non-BEV mode.

In the above structure, the controller may execute a filling process for setting a filling pressure that is higher than the supply pressure of the high-pressure process as a target pressure of the oil pump after shifting the traveling mode from the BEV mode to the non-BEV mode and before the high-pressure process, and the filling pressure of the filling process may be unchanged regardless of the BEV mode duration.

With the above structure, when the traveling mode shifts from the BEV mode to the non-BEV mode, the filling process is executed. This promptly increases the pressure of the oil in the oil passage from the oil pump to the chain tensioner. The filling pressure, when it is high, is not further increased in the filling process in accordance with the BEV mode duration TE. Thus, excessive load does not act on, for example, the oil pump and the oil passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of the present invention will now be described with reference to FIG. 1 to section (f) of 5. A schematic configuration of a vehicle 100 to which a controller 90 of the present disclosure is applied will now be described.

Figure 1:
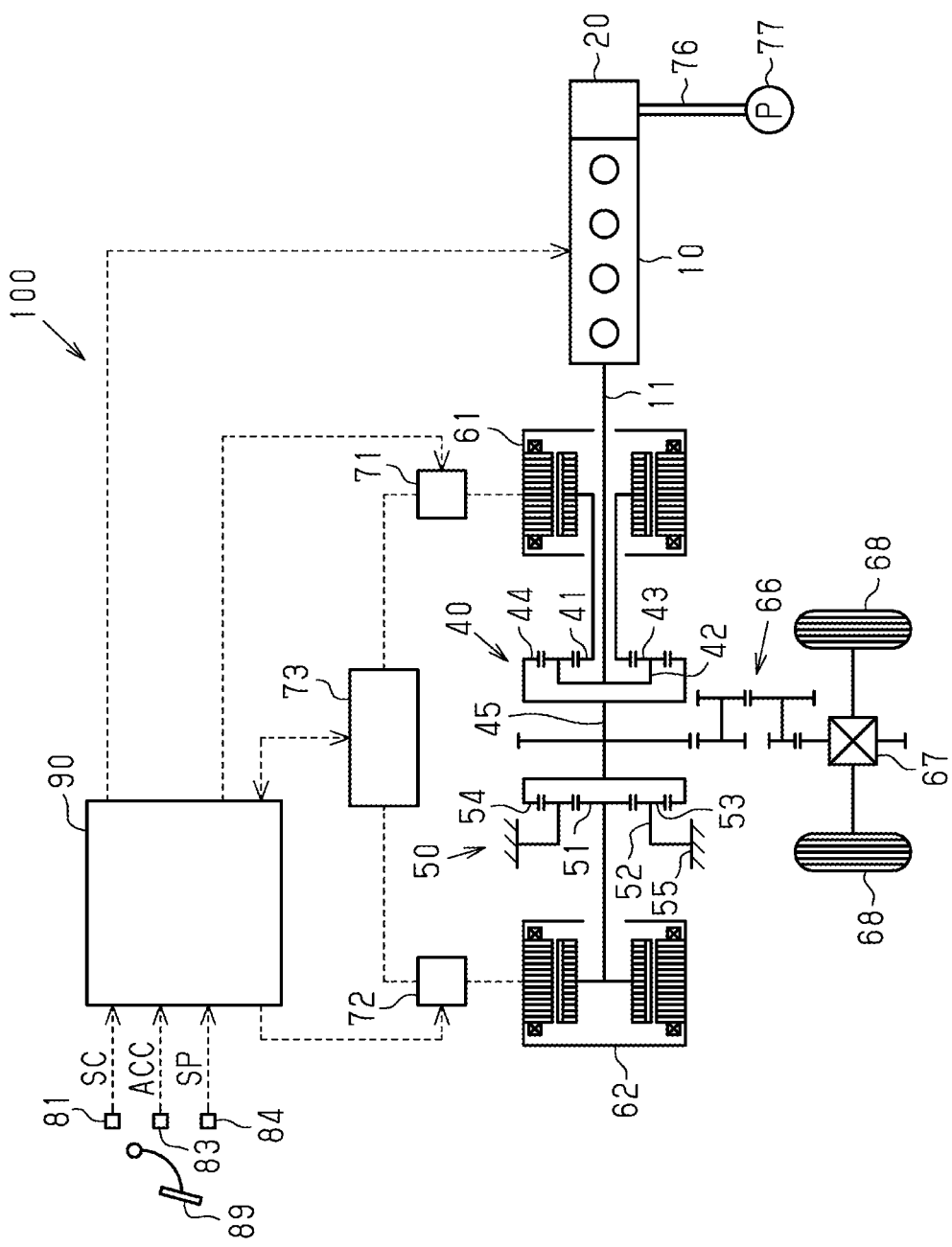
FIG. 1 is a schematic diagram of a vehicle.

As shown in FIG. 1, the vehicle 100 transmits force through a path formed by an internal combustion engine 10, a power splitting mechanism 40, a reduction mechanism 50, a first motor generator 61, a second motor generator 62, a transmission mechanism 66, a differential 67, and drive wheels 68.

The internal combustion engine 10 includes a crankshaft 11 that serves as an output shaft. The crankshaft 11 is connected to the power splitting mechanism 40. The power splitting mechanism 40 serves as a planetary gear mechanism including a sun gear 41, a carrier 42, pinion gears 43, a ring gear 44, and a ring gear shaft 45. The sun gear 41, which is an external gear, is coaxial with the ring gear 44, which is an internal gear. The sun gear 41 is connected to the ring gear 44 by the pinion gears 43. The carrier 42 supports the pinion gears 43 so that each pinion gear 43 can revolve about its axis. The carrier 42 also supports the pinion gears 43 so that the pinion gears 43 can orbit about the sun gear 41. Thus, the pinion gears 43 orbit the sun gear 41 as the carrier 42 rotates. The carrier 42 is connected to the crankshaft 11. The sun gear 41 is connected to the rotary shaft of the first motor generator 61.

When the torque of the internal combustion engine 10 is input to the carrier 42, the torque of the internal combustion engine 10 is distributed to the sun gear 41 and the ring gear 44. When the torque of the internal combustion engine 10 transmitted by the sun gear 41 is input to the rotary shaft of the first motor generator 61, the first motor generator 61 operates as a generator.

In contrast, when the first motor generator 61 operates as an electric motor, the torque of the first motor generator 61 is input to the sun gear 41. The torque of the first motor generator 61 input to the sun gear 41 is distributed to the carrier 42 and the ring gear 44. Then, when the torque of the first motor generator 61 transmitted by the carrier 42 is input to the crankshaft 11 of the internal combustion engine 10, the crankshaft 11 of the internal combustion engine 10 is rotated. In this manner, the first motor generator 61 is configured to supply torque to the internal combustion engine 10.

The ring gear 44 is connected to the ring gear shaft 45. The ring gear shaft 45 is rotated integrally with the ring gear 44. The ring gear shaft 45 is connected to the transmission mechanism 66. The transmission mechanism 66 includes, for example, a reduction gear mechanism and an automatic transmission. The transmission mechanism 66 is connected to the drive wheels 68 by the differential 67. The differential 67 allows the left and right drive wheels 68 to rotate at different speeds.

The ring gear shaft 45 is connected to the reduction mechanism 50. The reduction mechanism 50 serves as a planetary gear mechanism including a sun gear 51, a carrier 52, pinion gears 53, a ring gear 54, and a case 55. The sun gear 51, which is an external gear, is coaxial with the ring gear 54, which is an internal gear. The sun gear 51 is connected to the ring gear 54 by the pinion gears 53. The carrier 52 supports the pinion gears 53 so that each pinion gear 53 can revolve about its axis. The carrier 52 is fixed to the case 55 of the reduction mechanism 50. That is, the carrier 52 cannot rotate and the carrier 52 does not allow the pinion gears 53 to orbit about the sun gear 51. The ring gear 54 is connected to the ring gear shaft 45. The sun gear 51 is connected to the rotary shaft of the second motor generator 62.

The second motor generator 62 operates as a generator when the vehicle 100 decelerates so that a regenerative braking force is generated in the vehicle 100 in accordance with the amount of electric power generated by the second motor generator 62.

In contrast, when the second motor generator 62 operates as an electric motor, the torque of the second motor generator 62 is input to the drive wheels 68 by the reduction mechanism 50, the ring gear shaft 45, the transmission mechanism 66, and the differential 67. The drive wheels 68 are thus rotated by the torque of the second motor generator 62.

The vehicle 100 includes a first inverter 71, a second inverter 72, and a battery 73 that form a device for transferring electric power. The first inverter 71 adjusts the amount of electric power transferred between the first motor generator 61 and the battery 73. The second inverter 72 adjusts the amount of electric power transferred between the second motor generator 62 and the battery 73.

As shown in FIG. 1, the vehicle 100 includes a supply passage 76 and an oil pump 77 that form a mechanism for supplying oil. The oil pump 77, which is connected to the crankshaft 11, is driven when the crankshaft 11 is rotated. Thus, the oil pump 77 is a mechanical oil pump that discharges oil when the crankshaft 11 is rotated. Further, a regulation valve (not shown) is controlled to adjust the displacement of the oil pump 77 and vary the amount of oil discharged from the oil pump 77 at every rotation of the crankshaft 11. That is, the oil pump 77 is a variable displacement pump. The supply passage 76 is connected to the oil pump 77. The supply passage 76 supplies parts of the internal combustion engine 10 with oil discharged from the oil pump 77.

Figure 2:
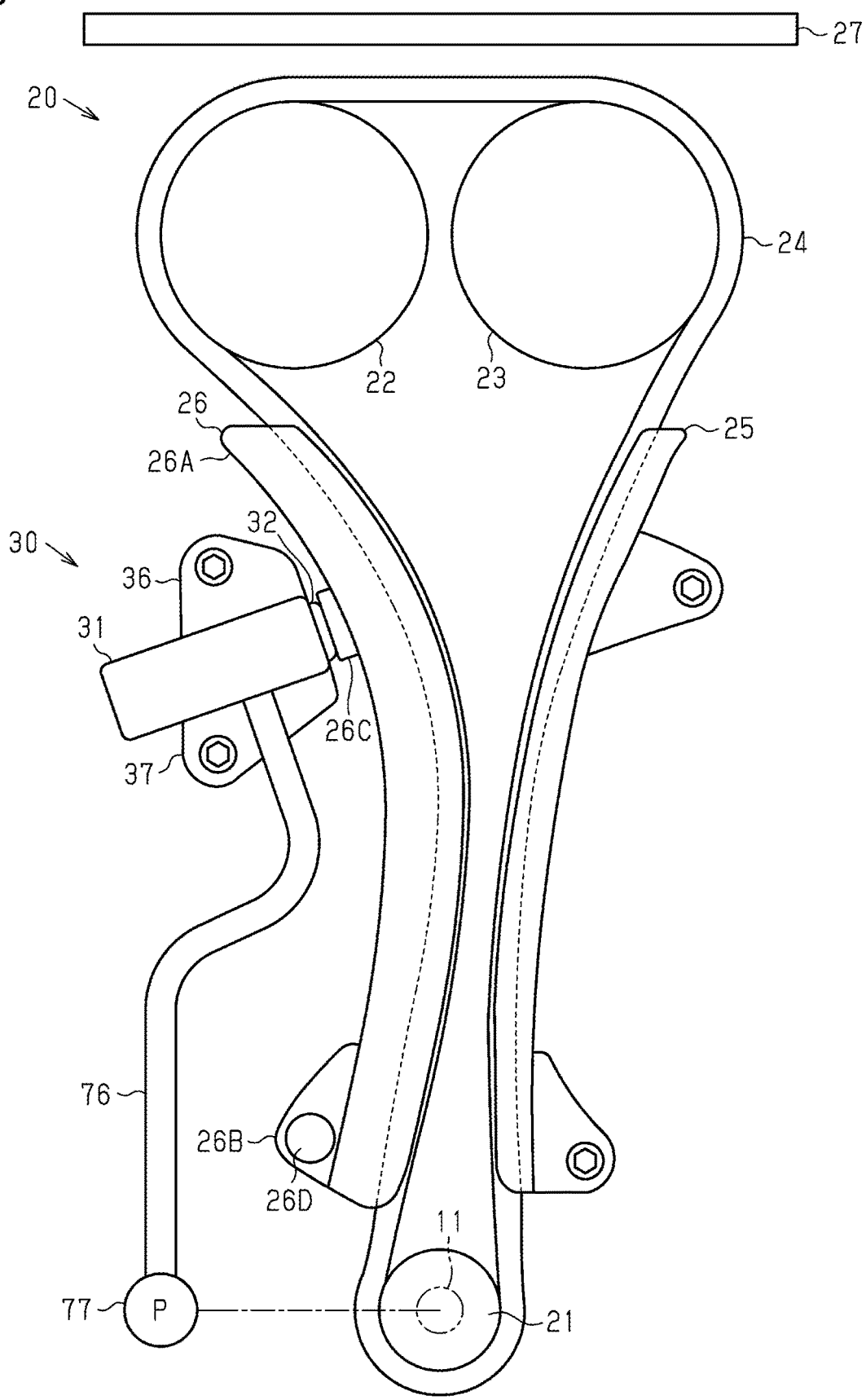
FIG. 2 is a front view of a chain mechanism.

As shown in FIG. 2, the vehicle 100 includes a chain mechanism 20 that transmits driving force of the crankshaft 11 to other devices. The chain mechanism 20 includes a drive sprocket 21, an intake sprocket 22, an exhaust sprocket 23, a chain 24, a fixed guide 25, a swing guide 26, a cover 27, and a chain tensioner 30.

The drive sprocket 21 is attached to the crankshaft 11. The intake sprocket 22 is attached to the intake camshaft (not shown) of the internal combustion engine 10. The exhaust sprocket 23 is attached to the exhaust camshaft (not shown) of the internal combustion engine 10. The intake camshaft selectively opens and closes each intake valve of the internal combustion engine 10, and the exhaust camshaft selectively opens and closes each exhaust valve of the internal combustion engine 10. The chain 24 runs around the drive sprocket 21, the intake sprocket 22, and the exhaust sprocket 23. Thus, rotation of the drive sprocket 21 moves the chain 24 and transmits driving force to the intake sprocket 22 and the exhaust sprocket 23. This rotates the intake sprocket 22 and the exhaust sprocket 23. Thus, in the present embodiment, the intake sprocket 22 and the exhaust sprocket 23 serve as idler sprockets.

The cover 27 is located near the intake sprocket 22 and the exhaust sprocket 23. The cover 27 covers the portion of the chain 24 between the intake sprocket 22 and the exhaust sprocket 23.

The fixed guide 25 is located near the chain 24 outside the region surrounded by the chain 24. The fixed guide 25 is located between the drive sprocket 21 and the exhaust sprocket 23. The fixed guide 25 extends from the drive sprocket 21 toward the exhaust sprocket 23. The fixed guide 25 is fixed by bolts on the outer surface of the internal combustion engine 10. The fixed guide 25 is in contact with the chain 24 from the outer side of the region surrounded by the chain 24.

Figure 3:
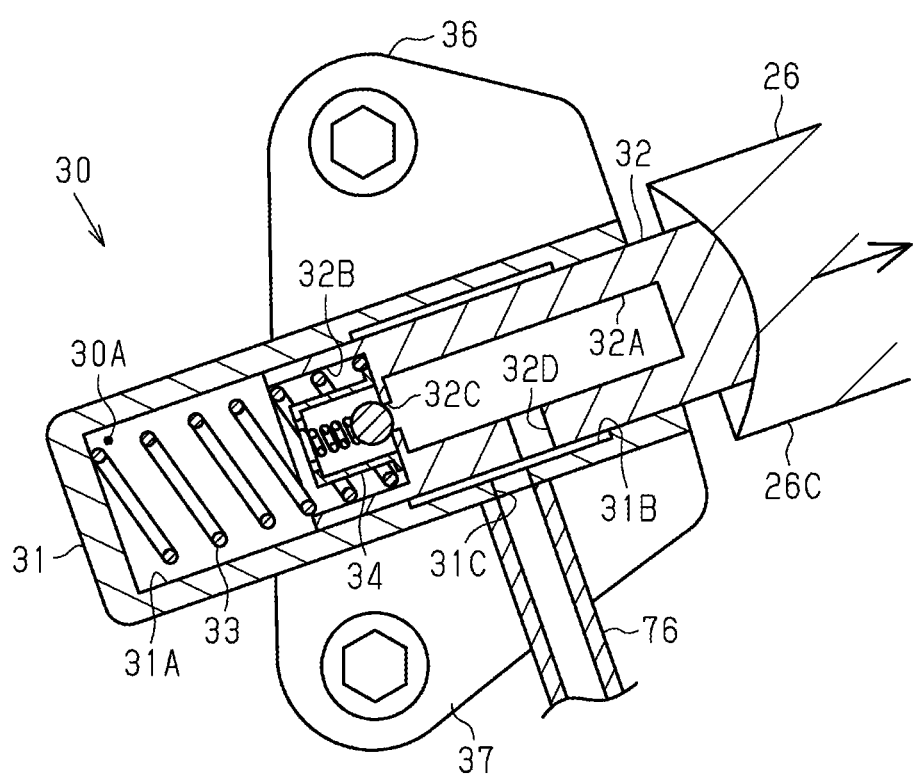
FIG. 3 is a cross-sectional view of a chain tensioner.

The swing guide 26 is located near the chain 24 outside the region surrounded by the chain 24. The swing guide 26 is located between the drive sprocket 21 and the intake sprocket 22. The swing guide 26 includes a guide body 26A, a support projection 26B, an abutment projection 26C, and a pivot shaft 26D. The guide body 26A extends from the vicinity of the drive sprocket 21 toward the intake sprocket 22. The guide body 26A has an arcuate central portion in the longitudinal direction that is bulged toward the chain 24. The support projection 26B is located at the end of the guide body 26A that is closer to the drive sprocket 21. The support projection 26B projects away from the chain 24. The pivot shaft 26D extends through the support projection 26B. The pivot shaft 26D is fixed to the internal combustion engine 10. The support projection 26B and the guide body 26A pivot about the pivot shaft 26D. The abutment projection 26C is located toward the intake sprocket 22 from the central portion of the guide body 26A. The abutment projection 26C projects away from the chain 24. As shown in FIG. 3, the projection end surface of the abutment projection 26C has a recessed central portion that is curved.

As shown in FIG. 2, the chain tensioner 30 is located at the side of the swing guide 26 opposite to the chain 24. As shown in FIG. 3, the chain tensioner 30 includes a housing 31, a plunger 32, a spring 33, a check valve mechanism 34, an upper flange 36, and a lower flange 37.

As shown in FIG. 3, the housing 31 is substantially tubular and includes an open first end and a closed second end. The opening of the housing 31 is directed toward the abutment projection 26C. The inner surface of the housing 31 includes a cavity 31A, a diameter-enlarging gap 31B, and a supply hole 31C. The cavity 31A extends in the housing 31 from the open first end of to the closed second end and defines a substantially cylindrical hollow. The diameter-enlarging gap 31B is connected to the substantially central portion of the cavity 31A in the axial direction. The diameter-enlarging gap 31B surrounds the cavity 31A in the circumferential direction and is substantially annular. The supply hole 31C extends from the diameter-enlarging gap 31B to the outer circumferential surface of the housing 31. The supply hole 31C is connected to the supply passage 76.

The upper flange 36 projects upward from the outer circumferential surface of the housing 31. The upper flange 36 is fixed to the outer surface of the internal combustion engine 10 by a bolt. The lower flange 37 projects downward from the outer circumferential surface of the housing 31. The lower flange 37 is fixed to the outer surface of the internal combustion engine 10 by a bolt.

The plunger 32 is substantially cylindrical. The outer diameter of the plunger 32 is slightly less than the inner diameter of the cavity 31A of the housing 31. The plunger 32 is positioned in the cavity 31A of the housing 31. A first end of the plunger 32 projects out of the cavity 31A. The first end of the plunger 32 includes an end surface that abuts the abutment projection 26C of the swing guide 26. The end surface of the first end of the plunger 32 is curved so as to be bulged outward at the central portion. A hydraulic pressure chamber 30A supplied with oil is defined in the cavity 31A between the end surface of a second end of the plunger 32 and the closed second end surface of the housing 31. The chain tensioner 30 also serves as an oil damper that uses the oil supplied to the hydraulic pressure chamber 30A.

The plunger 32 is hollow. The plunger 32 includes a first space 32A, a second space 32B, a connection hole 32C, and a guide hole 32D that are defined by the inner surface of the plunger 32. The second space 32B, the connection hole 32C, and the first space 32A are arranged in order from the second end toward the first end of the plunger 32. The second space 32B is substantially cylindrical. The second space 32B is open to the hydraulic pressure chamber 30A. The connection hole 32C is connected to the second space 32B. The connection hole 32C is substantially cylindrical. The diameter of the connection hole 32C is less than the diameter of the second space 32B. The first space 32A is connected to the connection hole 32C. The first space 32A is substantially cylindrical. The diameter of the first space 32A is greater than the diameter of the connection hole 32C. The guide hole 32D extends from the first space 32A to the outer circumferential surface of the plunger 32.

The spring 33 is located between the housing 31 and the plunger 32. The spring 33 is compressed. The spring 33 includes a first end that is in contact with the closed second end of the housing 31, which includes the cavity 31A. The spring 33 includes a second end that is located in the second space 32B of the plunger 32 and contacts a wall of the plunger 32 that defines the second space 32B. The spring 33 urges the plunger 32 toward the abutment projection 26C of the swing guide 26.

The check valve mechanism 34 is located in the second space 32B of the plunger 32 and attached to the wall of the plunger 32 that defines the second space 32B. The check valve mechanism 34 restricts the flow of oil through the connection hole 32C between the first space 32A and the second space 32B in accordance with the pressure of the oil in the first space 32A and the second space 32B. Specifically, the check valve mechanism 34 allows oil to flow from the first space 32A to the second space 32B through the connection hole 32C when the pressure of the oil in the first space 32A is higher than the pressure of the oil in the second space 32B. In contrast, the check valve mechanism 34 restricts the flow of oil from the second space 32B to the first space 32A through the connection hole 32C when the pressure of the oil in the first space 32A is lower than or equal to than the pressure of the oil in the second space 32B.

The electrical configuration of the vehicle 100 will now be described.

As shown in FIG. 1, the vehicle 100 includes a crank angle sensor 81, an accelerator position sensor 83, a speed sensor 84, and an accelerator pedal 89. The crank angle sensor 81 is arranged near the crankshaft 11. The crank angle sensor 81 detects a crank angle SC that corresponds to the rotation angle of the crankshaft 11. The accelerator position sensor 83 is arranged near the accelerator pedal 89 that is operated by a driver. The accelerator position sensor 83 detects an accelerator pedal position ACC that corresponds to the operation amount of the accelerator pedal 89 operated by the driver. The speed sensor 84 detects a vehicle speed SP that corresponds to the speed of the vehicle 100.

The vehicle 100 includes the controller 90. The controller 90 receives a signal indicating the crank angle SC from the crank angle sensor 81. The controller 90 receives a signal corresponding to the accelerator pedal position ACC from the accelerator position sensor 83. The controller 90 receives a signal corresponding to the vehicle speed SP from the speed sensor 84. The controller 90 calculates an engine speed NE that corresponds to the rotation speed of the crankshaft 11 from the crank angle SC.

The controller 90 calculates a vehicle request output that is a request value of the output required for the vehicle 100 to travel based on the accelerator pedal position ACC and the vehicle speed SP. The controller 90 determines a torque distribution of the internal combustion engine 10, the first motor generator 61, and the second motor generator 62 based on the vehicle request output. The controller 90 controls the output of the internal combustion engine 10 and the driving and regeneration of the first motor generator 61 and the second motor generator 62 based on the torque distribution of the internal combustion engine 10, the first motor generator 61, and the second motor generator 62.

The controller 90 outputs a control signal to the internal combustion engine 10 to execute various types of control on the internal combustion engine 10 such as adjustment of the intake air amount, adjustment of the fuel injection amount, and adjustment of the ignition time. The controller 90 outputs a control signal to the first inverter 71 when controlling the first motor generator 61. The controller 90 controls the first motor generator 61 with the first inverter 71 by adjusting the amount of electric power transferred between the first motor generator 61 and the battery 73. The controller 90 outputs a control signal to the second inverter 72 when controlling the second motor generator 62. The controller 90 controls the second motor generator 62 with the second inverter 72 by adjusting the amount of electric power transferred between the second motor generator 62 and the battery 73.

When the vehicle 100 travels, the controller 90 selects a Battery Electric Vehicle (BEV) mode or a Hybrid Electric Vehicle (HEV) mode as a traveling mode of the vehicle 100. The BEV mode is a traveling mode of the vehicle 100 that stops the internal combustion engine 10 and drives the first motor generator 61 and/or the second motor generator 62. Thus, in the BEV mode, the vehicle 100 travels using the torque of the first motor generator 61 and/or the torque of the second motor generator 62. The HEV mode is a traveling mode of the vehicle 100 that drives the internal combustion engine 10 in addition to the first motor generator 61 and the second motor generator 62. Thus, in the HEV mode, the vehicle 100 travels using the torque of the internal combustion engine 10 in addition to the torque of the first motor generator 61 and the torque of the second motor generator 62. In the present embodiment, the HEV mode is an example of a non-BEV mode.

When the vehicle 100 starts to move or travels under a light load, the controller 90 selects the BEV mode as long as the state of charge of the battery 73 is sufficient. The controller 90 selects the HEV mode when, for example, the state of charge of the battery 73 is insufficient.

When selecting the HEV mode as the traveling mode of the vehicle 100, the controller 90 calculates a normal pressure PB as a target pressure of the oil discharged from the oil pump 77 into the supply passage 76 under a normal situation. Specifically, the controller 90 calculates a higher value for the normal pressure PB as the engine speed NE increases. One example of the normal pressure PB is approximately several tens to several hundreds of kPa. Depending on the situation, the controller 90 also sets a value that is greater than the normal pressure PB as a target pressure of oil discharged from the oil pump 77 into the supply passage 76. The setting of the target pressure of oil will be described in detail later. The controller 90 controls the oil pump 77 so that the discharge amount of the oil pump 77 increases as the set target pressure increases.

When selecting the BEV mode as the traveling mode of the vehicle 100, the controller 90 measures a BEV mode duration TE that is the duration of the BEV mode. As described above, the internal combustion engine 10 is stopped when the BEV mode is selected. The oil pump 77 is stopped accordingly. Thus, when the BEV mode is selected, the controller 90 does not calculate the target pressure of oil discharged from the oil pump 77 into the supply passage 76.

The controller 90 may be configured as circuitry including one or more processors that execute various types of processes according to a computer program (software). The controller 90 may also be configured as circuitry including one or more dedicated hardware circuits such as application-specific integrated circuits (ASIC) that execute at least part of various types of processes or a combination thereof. The processor includes a CPU and memory such as RAM and ROM. The memory stores program codes or instructions configured to cause the CPU to execute processes. The memory, or computer readable media, includes any type of media that is accessible by versatile computers or dedicated computers.

Pressure control for setting the target pressure of oil discharged from the oil pump 77 will now be described. The controller 90 executes pressure control when the traveling mode of the vehicle 100 shifts from the BEV mode to the HEV mode.

Figure 4:
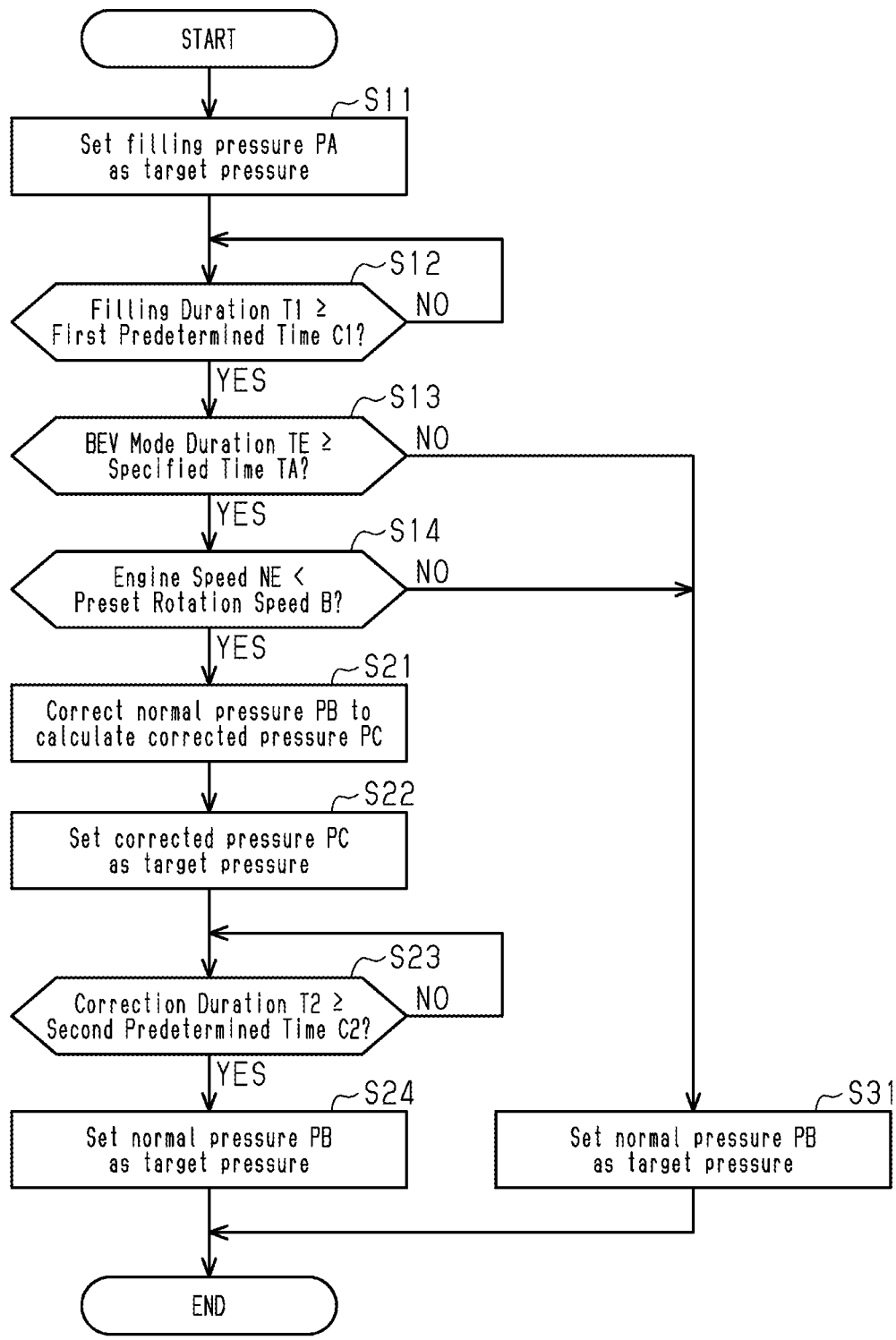
FIG. 4 is a flowchart showing pressure control.

As shown in FIG. 4, when pressure control starts, in step S11, the controller 90 sets a filling pressure PA determined in advance as the target pressure of the oil pump 77. The controller 90 controls the oil pump 77 by outputting a control signal to the oil pump 77 based on the set filling pressure PA. The filling pressure PA is a target value for promptly increasing the pressure of the oil inside the supply passage 76 when the internal combustion engine 10 is cranked. The filling pressure PA is a fixed value that is higher than the normal pressure PB. Thus, the filling pressure PA is not changed by the BEV mode duration TE. In other words, the filling pressure PA is independent of the BEV mode duration TE. One example of the filling pressure PA is approximately several hundreds of kPa, which is the maximum value for the pressure of oil discharged from the oil pump 77. Then, the controller 90 proceeds to step S12.

In step S12, the controller 90 determines whether a filling duration T1 that is the duration from when step S11 was executed is greater than or equal to a first predetermined time C1. The first predetermined time C1 is based on, for example, experiments and is the period of time required for the pressure of the oil in the supply passage 76 to increase to a sufficient level after the filling pressure PA is set. One example of the first predetermined time C1 is approximately several tens of seconds. In the present embodiment, step S11 and step S12 form a filling process.

When determining in step S12 that the filling duration T1 is less than the first predetermined time C1 (S12: NO), the controller 90 executes step S12 again. When determining in step S12 that the filling duration T1 is greater than or equal to the first predetermined time C1 (S12: YES), the controller 90 proceeds to step S13.

In step S13, the controller 90 determines whether the BEV mode duration TE is greater than or equal to a specified time TA. The specified time TA is determined in the following manner. While the BEV mode continues, air may enter the chain tensioner 30. The amount of air entering the chain tensioner 30 while the BEV mode continues tends to increase as the BEV mode duration TE becomes longer. When the amount of air entering the chain tensioner 30 exceeds a certain level, the air adverse effect on the oil damper functionality of the chain tensioner 30 cannot be ignored. Thus, the specified time TA is based on, for example, experiments and determined as a period of time in which the amount of air will adversely affect the oil damper functionality of the chain tensioner 30. One example of the specified time TA is approximately several tens of minutes.

When determining that the BEV mode duration TE is less than the specified time TA in step S13 (S13: NO), the controller 90 proceeds to step S31. When determining that the BEV mode duration TE is greater than or equal to the specified time TA in step S13 (S13: YES), the controller 90 proceeds to step S14. The controller 90 resets the BEV mode duration TE after the determination of step S13.

In step S14, the controller 90 determines whether the engine speed NE is less than a specified rotation speed B. The specified rotation speed B is determined in the following manner. As described above, the controller 90 calculates a higher value for the normal pressure PB as the engine speed NE increases. The specified rotation speed B is determined as a value for determining that the normal pressure PB is less than a threshold value, which is determined in advance. The threshold value for the normal pressure PB is obtained by dividing the filling pressure PA by a correction coefficient, which will be described later. One example of the specified rotation speed B is approximately several thousands of rpm. When determining that the engine speed NE is higher than or equal to the specified rotation speed B in step S14 (S14: NO), the controller 90 proceeds to step S31.

As described above, the controller 90 proceeds to step S31 when giving a negative determination in step S13 or step S14. In step S31, the controller 90 sets the normal pressure PB as the target pressure of the oil pump 77. The controller 90 controls the oil pump 77 by outputting a control signal to the oil pump 77 based on the set normal pressure PB. Then, the controller 90 ends the pressure control of the present cycle.

When determining that the engine speed NE is less than the specified rotation speed B in step S14 (S14: YES), the controller 90 proceeds to step S21.

In step S21, the controller 90 calculates a corrected pressure PC by multiplying the normal pressure PB by a correction coefficient. The correction coefficient is based on, for example, experiments and determined in advance to calculate a value that is greater than the normal pressure PB. One example of the correction coefficient is a fixed value greater than 1. As described above, when step S21 is executed, the normal pressure PB is less than the threshold value. The threshold value is obtained by dividing the filling pressure PA by the correction coefficient. Thus, the corrected pressure PC obtained by multiplying the normal pressure PB by the correction coefficient is less than the filling pressure PA. Then, the controller 90 proceeds to step S22.

In step S22, the controller 90 sets the corrected pressure PC as the target pressure of the oil pump 77. The controller 90 controls the oil pump 77 by outputting a control signal to the oil pump 77 based on the set corrected pressure PC. Then, the controller 90 proceeds to step S23.

In step S23, the controller 90 determines whether a correction duration T2 that is the duration from when the corrected pressure PC is set is greater than or equal to a second predetermined time C2. The second predetermined time C2 is based on, for example, experiments and determined as a period of time required for the air in the chain tensioner 30 to be completely discharged after the corrected pressure PC is set. One example of the second predetermined time C2 is approximately several tens of seconds to several minutes.

In the present embodiment, steps S21 to S23 set the corrected pressure PC as the target pressure of the oil pump 77. As a result, the pressure of the oil supplied to the inside of the chain tensioner 30 becomes higher than that when the normal pressure PB is set at the target pressure of the oil pump 77. Steps S21 to S23 are executed when a positive determination is given in step S13. Thus, steps S21 to S23 form a high-pressure process for increasing the supply pressure when the BEV mode duration TE is greater than or equal to the specified time TA.

When determining that the correction duration T2 is less than the second predetermined time C2 in step S23 (S23: NO), the controller 90 executes step S23 again. When determining that the correction duration T2 is greater than or equal to the second predetermined time C2 in step S23 (S23: YES), the controller 90 proceeds to step S24.

In step S24, the controller 90 sets the normal pressure PB as the target pressure of the oil pump 77. The controller 90 controls the oil pump 77 by outputting a control signal to the oil pump 77 based on the set normal pressure PB. Then, the controller 90 ends the pressure control of the present cycle.

The operation of the present embodiment will now be described.

Figure 5:
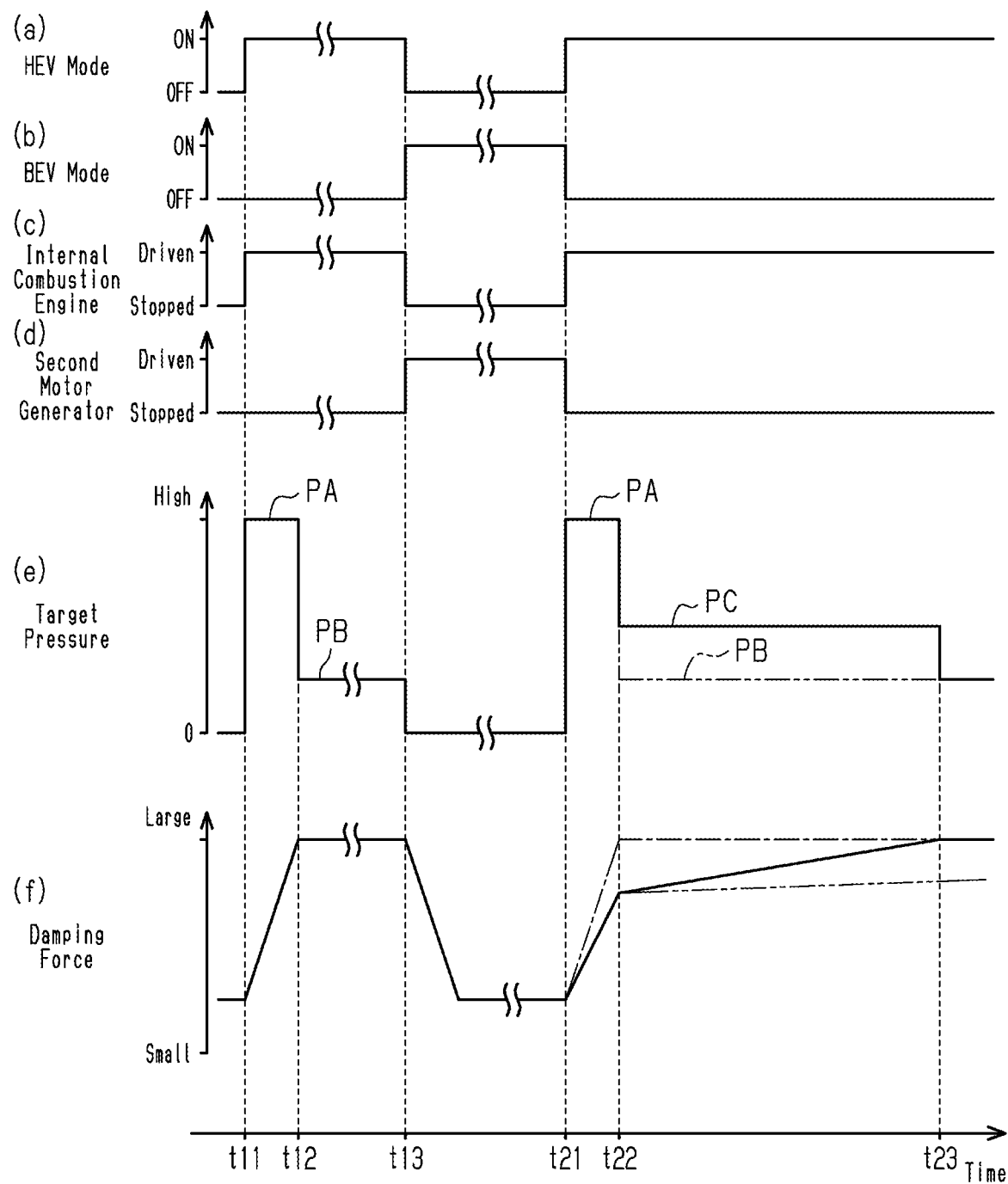
FIG. 5 is a time chart in which section (a) shows changes in the selection state of a Hybrid Electric Vehicle (HEV) mode, section (b) shows changes in the selection state of a Battery Electric Vehicle (BEV) mode, section (c) shows changes in the driving state of an internal combustion engine, section (d) shows changes in the driving state of a second motor generator, section (e) shows changes in the target pressure of an oil pump, and section (f) shows changes in the damping force of the chain tensioner.

As shown in section (e) of FIG. 5, when the target pressure of oil discharged from the oil pump 77 into the supply passage 76 is not calculated, the target pressure of the oil pump 77 is set to "0."

As shown in section (a) of FIG. 5, at time t11, the system of the vehicle 100 is driven and the HEV mode is selected as the traveling mode of the vehicle 100. Thus, as shown in section (c) of FIG. 5, the internal combustion engine 10 is driven at time t11. When the internal combustion engine 10 is driven and the crankshaft 11 is rotated, the oil pump 77 is driven to discharge oil. This supplies oil from the oil pump 77 to the supply passage 76 and to the inside of the chain tensioner 30. In the chain tensioner 30, the oil is supplied via the supply hole 31C of the housing 31 and the guide hole 32D, first space 32A, connection hole 32C, and second space 32B of the plunger 32 to the hydraulic pressure chamber 30A. As a result, the chain tensioner 30 increases the projection amount of the plunger 32, which is in accordance with the pressure of the oil in the hydraulic pressure chamber 30A and the urging force of the spring 33, and pushes the swing guide 26 against the chain 24.

In the chain tensioner 30, movement of the chain 24 applies force to the swing guide 26 that acts on the plunger 32. The projection amount of the plunger 32 decreases as the force from the swing guide 26 acting on the plunger 32 increases. This results in oil flowing out of the hydraulic pressure chamber 30A through the gap between the inner circumferential surface of the housing 31 and the outer circumferential surface of the plunger 32 and damps the force from the swing guide 26 acting on the plunger 32. Thus, the chain tensioner 30 serves as an oil damper that uses the oil supplied from the oil pump 77.

As shown in section (b) of FIG. 5, at time t13, the BEV mode is selected as the traveling mode of the vehicle 100. Thus, as shown in section (c) of FIG. 5 and section (d) of FIG. 5, the internal combustion engine 10 is stopped and the second motor generator 62 is driven at time t13. When the internal combustion engine 10 is stopped in this manner, the oil pump 77 is also stopped. This stops the supply of oil from the oil pump 77 to the supply passage 76 and to the inside of the chain tensioner 30 after time t13. As a result, the pressure of the oil inside the chain tensioner 30 gradually declines from time t13. This lowers the oil damper functionality of the chain tensioner 30 and reduces the damping force as shown in section (f) of FIG. 5.

As shown in section (c) of FIG. 5, from time t13 to time t21, the internal combustion engine 10 is not driven. Thus, the internal combustion engine 10 does not generate force that rotates the crankshaft 11. However, as shown in section (d) of FIG. 5, from time t13 to time t21, the second motor generator 62 is driven and the driving force of the second motor generator 62 may be transmitted to the crankshaft 11 via the reduction mechanism 50 and the power splitting mechanism 40. In this case, the driving force of the second motor generator 62 will slightly rotate the crankshaft 11 in forward and rearward directions. This may oscillate the crankshaft 11 and change the tension on the chain 24. In such a case, force will be applied to the chain 24 and act via the swing guide 26 on the chain tensioner 30.

The projection amount of the plunger 32 will decrease as the force from the swing guide 26 acting on the plunger 32 increases. The oil will flow out of the hydraulic pressure chamber 30A through the gap between the inner circumferential surface of the housing 31 and the outer circumferential surface of the plunger 32. When the force from the swing guide 26 acting on the plunger 32 decreases, the urging force of the spring 33 will increase the projection amount of the plunger 32.

In this case, the oil pump 77 is stopped and the pressure of the oil in the supply passage 76 is low. Thus, air may be included in the supply passage 76. This may result in the air of the supply passage 76 entering the hydraulic pressure chamber 30A of the chain tensioner 30 when the projection amount of the plunger 32 increases. In particular, as the BEV mode duration TE, which continues from time t13 to time t21, becomes longer, there will be more opportunities for air to enter the hydraulic pressure chamber 30A of the chain tensioner 30. Thus, air is more likely to enter the hydraulic pressure chamber 30A.

Then, as shown in section (a) of FIG. 5, at time t21, the HEV mode is selected again as the traveling mode of the vehicle 100. Thus, as shown in section (c) of FIG. 5, the internal combustion engine 10 is driven at time t21. Further as shown in section (e) of FIG. 5, when the filling pressure PA is set as the target pressure of the oil pump 77 at time t21, oil is supplied to the hydraulic pressure chamber 30A of the chain tensioner 30 through the supply passage 76. Thus, even when the hydraulic pressure chamber 30A of the chain tensioner 30 includes air, the damping force of the chain tensioner 30 gradually increases from time t21 to time t22 as shown by the solid line of section (f) of FIG. 5. However, as shown by the solid line of section (f) of FIG. 5, the damping force of the chain tensioner 30 when the hydraulic pressure chamber 30A of the chain tensioner 30 includes air is less than when the hydraulic pressure chamber 30A does not include air as shown by the long-dash short-dash line of section (f) of FIG. 5. In this manner, when the damping force of the chain tensioner 30 becomes small, the moving chain 24 may vibrate. When the chain 24 vibrates, the chain 24 may contact the cover 27 and generate noise.

In this respect, in the present embodiment, when the BEV mode duration TE is greater than or equal to the specified time TA, the corrected pressure PC, which is higher than the normal pressure PB shown by the long-dash double-short-dash line of section (e) of FIG. 5, is set as the target pressure of the oil pump 77 at time t22 as shown by the solid line of section (e) of FIG. 5. This increases the amount of oil flowing into the hydraulic pressure chamber 30A of the chain tensioner 30 and the amount of oil discharged from the hydraulic pressure chamber 30A after time t22 than when the normal pressure PB is set as the target pressure of the oil pump 77. Then, at time t23, the normal pressure PB is set as the target pressure of the oil pump 77 after the second predetermined time C2 elapses from time t22.

The advantages of the present embodiment will now be described.

(1) In the present embodiment, when the BEV mode duration TE is greater than or equal to the specified time TA, the corrected pressure PC, which is higher than the normal pressure PB, is set as the target pressure of the oil pump 77. This increases the amount of oil flowing into the hydraulic pressure chamber 30A and the amount of oil discharged from the hydraulic pressure chamber 30A. As a result, even if the hydraulic pressure chamber 30A of the chain tensioner 30 includes air when the traveling mode of the vehicle 100 shifts from the BEV mode to the HEV mode, the air is promptly discharged out of the hydraulic pressure chamber 30A together with the oil. The prompt discharge of air from the hydraulic pressure chamber 30A promptly restores the damping force of the chain tensioner 30 as shown by the solid line of section (f) of FIG. 5.

(2) A higher pressure is calculated as the normal pressure PB as the engine speed NE increases. Thus, when the engine speed NE is higher than or equal to the specified rotation speed B, the normal pressure PB is sufficiently high. When the normal pressure PB is sufficiently high and the corrected pressure PC, which is higher than the normal pressure PB, is set as the target pressure of the oil pump 77, this will result in unnecessary driving force of the internal combustion engine 10 being used to drive the oil pump 77.

In this respect, in the present embodiment, the corrected pressure PC, which is higher than the normal pressure PB is set as the target pressure of the oil pump 77 on condition that the engine speed NE is less than the specified rotation speed B. Accordingly, the corrected pressure PC, which is higher than the normal pressure PB is not set as the target pressure of the oil pump 77 when the engine speed NE is higher than or equal to the specified rotation speed B and the pressure of the oil supplied from the oil pump 77 to the chain tensioner 30 is sufficient. Thus, there is no unnecessary loss in the driving force of the internal combustion engine 10 used to drive the oil pump 77.

(3) In the present embodiment, when the traveling mode shifts from the BEV mode to the HEV mode, the filling pressure PA, which is higher than the corrected pressure PC, is set as the target pressure of the oil pump 77. This promptly increases the pressure of the oil in the supply passage 76. The filling pressure PA is not further increased in accordance with, for example, the BEV mode duration TE. Thus, excessive load does not act on the oil pump 77, the supply passage 76, and the like.

The present embodiment may be modified as described below. The present embodiment and the following modifications can be combined as long as the combined modifications remain technically consistent with each other.

In the above embodiment, the condition for calculating the corrected pressure PC, that is, the condition for executing step S21 may be modified. For example, step S14 may be omitted, and the controller 90 may calculate the corrected pressure PC regardless of the engine speed NE.

In the above embodiment, the calculation of the corrected pressure PC may be modified. For example, the corrected pressure PC does not need to be calculated by multiplying the normal pressure PB by a correction coefficient. Instead, the corrected pressure PC may be calculated by adding a predetermined correction value to the normal pressure PB.

Further, the controller 90 may calculate a higher value as the corrected pressure PC as the BEV mode duration TE increases. This increases the pressure of the oil supplied to the hydraulic pressure chamber 30A as the BEV mode duration TE becomes longer and the likelihood of air being included in the hydraulic pressure chamber 30A of the chain tensioner 30 increases. Thus, even when the BEV mode duration TE becomes longer, air is promptly discharged from the hydraulic pressure chamber 30A in the following HEV mode.

Step S13 may be omitted when a higher value is calculated as the corrected pressure PC as the BEV mode duration TE becomes longer as described above. Specifically, the corrected pressure PC will become a lower value as the BEV mode duration TE becomes shorter. Thus, step S13 may be omitted by replacing the normal pressure PB with the corrected pressure PC when the BEV mode duration TE is short.

When a higher value is calculated as the corrected pressure PC as the BEV mode duration TE becomes longer, the corrected pressure PC may be increased in steps as the BEV mode duration TE becomes longer. Alternatively, the BEV mode duration TE may be in direct proportion to the corrected pressure PC. In a case in which the BEV mode duration TE is in direct proportion to the corrected pressure PC, the corrected pressure PC when the BEV mode duration TE is greater than or equal to a given preset duration is higher than the corrected pressure PC when the BEV mode duration TE is less than the given preset duration. Thus, this modification corresponds to a high-pressure process in which the supply pressure of oil when the BEV mode duration TE is greater than or equal to a preset duration is higher than the supply pressure of oil when the BEV mode duration TE is less than the preset duration.

The controller 90 does not need to calculate the corrected pressure PC based on the normal pressure PB. Specifically, in step S22, the controller 90 may set, as the target pressure of the oil pump 77, a fixed pressure determined in advance to be a value greater than a range of the normal pressure PB calculated based on the engine speed NE.

In the above embodiment, the filling pressure PA when the BEV mode duration TE is greater than or equal to the specified time TA may be greater than the filling pressure PA when the BEV mode duration TE is less than the specified time TA. In this case, the filling pressure PA when the BEV mode duration TE is less than the specified time TA needs to be less than the maximum discharge pressure of the oil pump 77.

In the above embodiment, the calculation of the normal pressure PB may be modified. For example, the controller 90 may calculate the normal pressure PB regardless of the engine speed NE. The normal pressure PB may be a fixed value determined in advance.

In the above embodiment, the vehicle 100 does not need to include the first motor generator 61 and the second motor generator 62. Instead, the vehicle 100 may include at least one motor generator. In other words, the vehicle need only include at least one motor generator and an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, the vehicle comprising:
   an internal combustion engine;
   a motor generator;
   a drive sprocket fixed to a crankshaft of the internal combustion engine;
   an idler sprocket to which a driving force is transmitted from the drive sprocket;
   a chain running around the drive sprocket and the idler sprocket;
   a swing guide supported in a swingable manner;
   a chain tensioner that pushes the swing guide against the chain; and
   an oil pump that discharges oil when the crankshaft rotates, wherein
   the controller is configured to control a traveling mode of the vehicle in a Battery Electric Vehicle mode that stops the internal combustion engine and drives the motor generator when the vehicle travels or a non-BEV mode that drives the internal combustion engine when the vehicle travels,
   the chain tensioner has an oil damper functionality that uses oil supplied from the oil pump, and
   when shifting the traveling mode of the vehicle from the BEV mode to the non-BEV mode, the controller is configured to execute a high-pressure process for controlling the oil pump such that a supply pressure of oil supplied to the chain tensioner becomes higher when a duration of the BEV mode is greater than or equal to a specified time than when the BEV mode duration is less than the specified time.

2. The controller for the vehicle according to claim 1, wherein the controller is configured to execute the high-pressure process on condition that an engine speed of the internal combustion engine is less than or equal to a specified rotation speed.

3. The controller for the vehicle according to claim 1, wherein the controller is configured to increase the supply pressure in the high-pressure process as the BEV mode duration becomes longer.

4. The controller for the vehicle according to claim 1, wherein
the controller is configured to execute a filling process for setting a filling pressure that is higher than the supply pressure of the high-pressure process as a target pressure of the oil pump after shifting the traveling mode of the vehicle from the BEV mode to the non-BEV mode and before the high-pressure process, and
the filling pressure of the filling process is unchanged regardless of the BEV mode duration.

* * * * *